(12) United States Patent
Arvilla et al.

(10) Patent No.: US 12,072,546 B2
(45) Date of Patent: Aug. 27, 2024

(54) CABLE TROUGH AND METHOD

(71) Applicant: COMMSCOPE TECHNOLOGIES LLC, Hickory, NC (US)

(72) Inventors: Ruben Arvilla, Chihuahua (MX); Shannon T. Terry, Plymouth, MN (US); Oscar Daniel Valenzuela Lopez, Chihuahua (MX)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 230 days.

(21) Appl. No.: 17/628,433

(22) PCT Filed: Jul. 17, 2020

(86) PCT No.: PCT/US2020/042625
§ 371 (c)(1),
(2) Date: Jan. 19, 2022

(87) PCT Pub. No.: WO2021/016113
PCT Pub. Date: Jan. 28, 2021

(65) Prior Publication Data
US 2022/0269026 A1    Aug. 25, 2022

(51) Int. Cl.
*G02B 6/46* (2006.01)
*G02B 6/44* (2006.01)
(Continued)

(52) U.S. Cl.
CPC ........... *G02B 6/475* (2023.05); *G02B 6/4459* (2013.01); *H02G 3/0437* (2013.01); *H02G 3/045* (2013.01);
(Continued)

(58) Field of Classification Search
None
See application file for complete search history.

(56) References Cited

U.S. PATENT DOCUMENTS 5,067,678 A  *  11/1991  Henneberger ....... G02B 6/4459
                                                   248/68.1
5,316,243 A  *   5/1994  Henneberger ....... G02B 6/4459
                                                   248/68.1
(Continued)

OTHER PUBLICATIONS

International Search Report and Written Opinion of the International Searching Authority for International Patent Application No. PCT/US2020/042625 mailed Nov. 6, 2020, 8 pages.
(Continued)

*Primary Examiner* — Jerry Rahll
(74) *Attorney, Agent, or Firm* — Merchant & Gould

(57) ABSTRACT

The present disclosure relates generally to a cable routing system including a cable exit trough and a fastener. The cable exit tough includes a base portion, a first sidewall, and a second sidewall extending from the base portion to define a cable exit pathway. A first cutout is located between the base portion and the first sidewall, and a second cutout is located between the base portion and the second sidewall. A support member has a top edge and a bottom edge, and the support member extends on a top edge from a bottom surface of the base portion. A ledge extends perpendicular from the top edge of the support member in an opposing direction from the cable exit pathway. A first and second bracket extend from first end and a second end of the support member. A fastener is capable of extending through the slot and the receiving slot, wherein tightening the fastener causes the first extending portion and the second extending portion to compress.

19 Claims, 20 Drawing Sheets

(51) Int. Cl.
*H02G 3/04* (2006.01)
*H02G 3/06* (2006.01)

(52) U.S. Cl.
CPC ......... *H02G 3/0608* (2013.01); *H02G 3/0456* (2013.01)

(56) References Cited

U.S. PATENT DOCUMENTS

| | | | | |
|---|---|---|---|---|
| 5,937,131 | A * | 8/1999 | Haataja | H02G 3/0608 385/136 |
| 6,415,091 | B1 * | 7/2002 | Daub | G02B 6/4452 385/136 |
| 6,448,495 | B1 * | 9/2002 | Mattei | G02B 6/4459 174/95 |
| 6,522,823 | B1 * | 2/2003 | Wentworth | H02G 3/0608 385/134 |
| 6,625,373 | B1 * | 9/2003 | Wentworth | H02G 3/045 385/134 |
| 6,633,718 | B1 * | 10/2003 | Thom | G02B 6/4459 385/136 |
| 6,715,719 | B2 | 4/2004 | Nault et al. | |
| 7,530,745 | B2 | 5/2009 | Holmquist | |
| 7,825,342 | B2 * | 11/2010 | Caveney | H02G 3/0608 174/101 |
| 9,453,981 | B2 | 9/2016 | Haataja et al. | |
| 10,139,580 | B2 | 11/2018 | Crain et al. | |
| 2002/0154880 | A1 * | 10/2002 | Haataja | G02B 6/4459 385/136 |
| 2003/0198453 | A1 * | 10/2003 | Haataja | H02G 3/0608 385/136 |
| 2011/0225797 | A1 * | 9/2011 | Haataja | H02G 3/0608 29/428 |
| 2011/0229103 | A1 | 9/2011 | Haataja et al. | |
| 2017/0248766 | A1 | 8/2017 | Coburn et al. | |

OTHER PUBLICATIONS

FiberGuide® Fiber Management Systems, CommScope, 1-84 (2018).
Fiberguide® Optical Raceway Solutions: Comprehensive, long-term management for your growing fiber network, CommScope, 1-6 (2018).

* cited by examiner

CABLE TROUGH AND METHOD

CROSS-REFERENCE TO RELATED APPLICATION

This application is and a National Stage Application of PCT/US2020/042625, filed on Jul. 17, 2020, which claims the benefit of U.S. Patent Application Ser. No. 62/876,544, filed on Jul. 19, 2019, the disclosures of which are incorporated herein by reference in their entireties. To the extent appropriate, a claim of priority is made to each of the above disclosed applications.

TECHNICAL FIELD

The present disclosure relates generally to systems and methods for the management and routing of optical fiber cables.

BACKGROUND

In the telecommunications industry, the use of optical fibers for signal transmissions is accelerating. With the increased utilization of optical fiber systems, optical fiber cable management requires industry attention. To manage such cables, cable management structures may be mounted on the ceilings and/or floors of a data center. It is desirable to have structures organizing the cables within such racks.

One area where optical fiber management is necessary is the routing of optical fibers from one piece of optical fiber equipment to another. For example, in a telecommunications facility, optical fiber cables may be routed between fiber distribution equipment and optical line terminating equipment. In buildings and other structures that carry such equipment, the cable routing can take place in concealed ceiling areas or in any other manner to route cables from one location to another.

When routing optical fibers, it is desirable that any routing system will be readily modifiable and adaptable to changes in equipment needs. Accordingly, a routing system is not practical that would require a high capital outlay and which could not be readily adapted to changes in a customer's needs. Namely, if routing paths, once established, are forever fixed, the system cannot adapt. Also, and perhaps most important, any routing system must protect optical fibers from damage. In the use of optical fibers, it is recognized that the fibers should not be bent beyond a minimum radius of curvature.

SUMMARY

One aspect of the present disclosure relates to a cable routing system. The system includes a cable exit trough and a fastener. The cable exit trough includes a base portion, and a first and second sidewall extending from the base portion to define a cable exit pathway. A first cutout is located between the base portion and the first sidewall, and a second cutout is located between the base portion and the second sidewall. The first and second cutouts extend partially into the cable exit pathway. A support member has a top edge and a bottom edge. The support member extends on a top edge from a bottom surface of the base portion. A ledge extends perpendicular from the top edge of the support member in an opposing direction from the cable exit pathway. A first bracket is located on a first end of the support member and a second bracket is located on a second end of the support member. Each bracket includes a first extending portion having a slot and a second extending portion having a receiving slot. A fastener includes a turn piece, a threaded cylinder, and a bar. The bar and the threaded cylinder are capable of extending through the slot and the receiving slot. Tightening the fastener causes the first extending portion and the second extending portion to compress.

Another aspect of the present disclosure relates to a cable routing system. The system includes a cable exit trough and a fastener. The cable exit trough includes a base portion, and a first and second sidewall extending from the base portion to define a cable exit pathway. A first cutout is located between the base portion and the first sidewall, and a second cutout is located between the base portion and the second sidewall. The first and second cutouts extend partially into the cable exit pathway. A support member has a top edge and a bottom edge. The support member extends on a top edge from a bottom surface of the base portion. A ledge extends perpendicular from the top edge of the support member in an opposing direction from the cable exit pathway. A first bracket is located on a first end of the support member and a second bracket is located on a second end of the support member. Each bracket includes a first extending portion having a slot and a second extending portion having a receiving slot. A fastener includes a turn piece, a threaded cylinder, and a bar. The bar and the threaded cylinder are capable of extending through the slot and the receiving slot. Tightening the fastener causes the first extending portion and the second extending portion to compress. The cable exit trough is capable of being mounted to a first lateral wall of a rack system. The cable exit pathway extends over a top edge of the first lateral wall so that a cable can be routed from the rack system and out through the cable exit pathway.

Another aspect relates to a method of assembling a cable routing management system. The method includes providing a rack system having a first lateral wall and a second lateral wall connected by a plurality of rung members to define a trough surface. A cable exit trough is mounted to the first lateral wall of the rack system. A plurality of cables is routed from the rack system and transversely through the cable exit trough.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Aspects of the present disclosure relate to systems and methods for managing optical fibers. A ladder rack system includes a plurality of rungs that extend between a first and second lateral wall to provide a trough-like enclosure to hold optical fibers. The exit trough as described herein is configured to mate with a ladder rack system to provide an exit pathway for a plurality of optical fibers. The ladder rack system can be part of a cable routing system typically within a structure, such as a building having optical fiber signal transmitting equipment. Rack systems may be suspended from a ceiling structure by any suitable means (not shown). The exit trough as described herein is not only usable with a rack system as shown in FIGS. 16-19, but also with other cable routing system disclosed in U.S. Pat. No. 10,139,580, the disclosure of which is hereby incorporated by reference, and other cable routing systems.

As shown and described below, exit troughs mount around the first lateral wall. The exit trough is configured to rest upon a top edge of the first lateral wall and having a bracket mechanism that connects around a base of the first lateral wall. The exit trough provides a cable exit pathway from the rack system. The cables exit from the rack system in a generally perpendicular direction through the exit trough.

Figure 1:
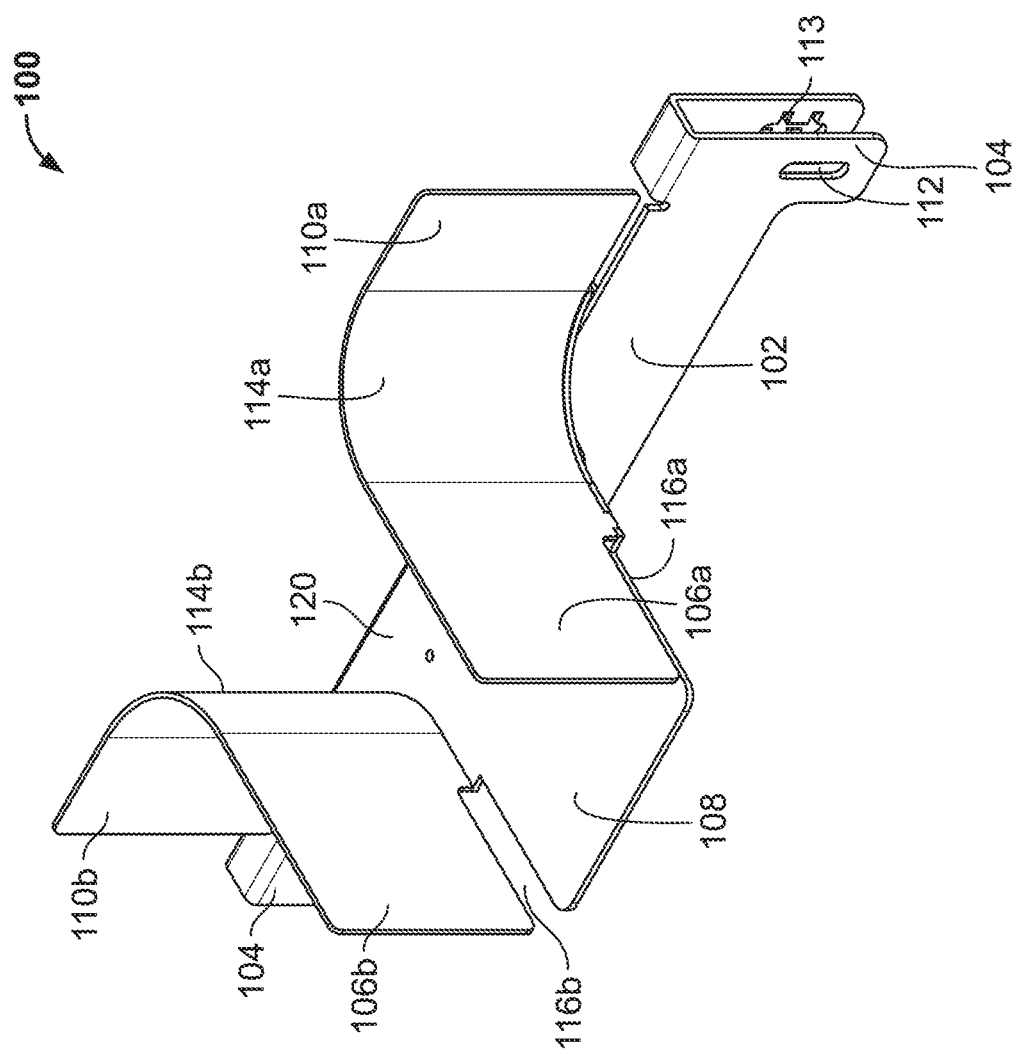
FIG. 1 illustrates an example embodiment of an exit trough.

FIG. 1 illustrates an example embodiment of an exit trough 100. Exit trough 100 includes a support member 102 having a first bracket mechanism 104 at a first end and a second bracket mechanism 104 at a second end. The support member 102 may have a planar shape, and faces the lateral wall of the rack system.

Each bracket mechanism 104 includes a slot 112 on an outside face, which is configured to receive a fastener. The bracket mechanism 104 also includes a receiving slot 113 on an inside face, that engages with the fastener. The fastener provides an additional friction fit of the exit trough 100 around the lateral wall of the rack, and is described in more detail at FIG. 16.

Exit trough 100 also includes an exit trough portion 120 extending generally in the middle of the support member 102. The exit trough portion 120 includes a base exit surface 108, a first sidewall 106a, and second sidewall 106b. The base exit surface 108 and the first and second side walls 106a, 106b define a generally U-shaped trough section through which optical cables extend. A first and second cutout 116a, 116b are provided at the open end of the exit trough portion 120 between the base exit surface 108 and each of the sidewalls 106a, 106. The first and second cutouts 116a, 116b allow the exit trough 100 to be connected to other cable routing components, as well as provides more flexibility. The base exit surface 108 has a planar surface and extends generally flat, from a first end located at the rack system to the open second end. The second end may be open or alternatively may be connected to another fiber optical cable management component.

Exit trough 100 also includes a first and second lateral sidewall 110a, 110b that extend generally parallel to the lateral walls of the rack system. First and second lateral side walls 110a, 110b connect to first and second side walls 106a, 106b at an angled side wall portion 114a, 114b.

Figure 2:
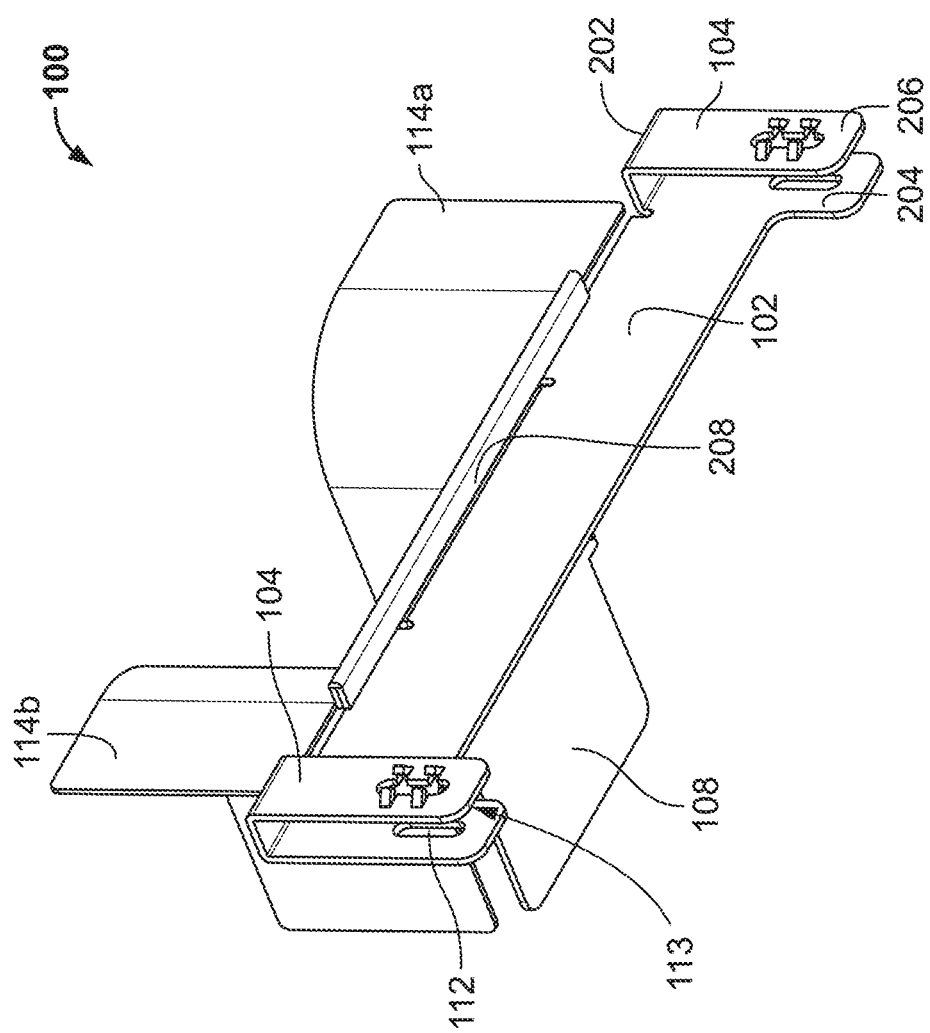
FIG. 2 illustrates a rear view of the exit trough of FIG. 1.

FIG. 2 illustrates a rear view of the exit trough 100. The exit trough 100 includes the support member 102 having a first bracket mechanism 104 at a first end, and a second bracket mechanism 104 at a second end. Each bracket mechanism 104 includes a top surface portion 202, a first extending portion 204, and a second extending portion 206. The top surface portion 202, the first extending portion 204, and the second extending portion 206 define a U-shaped portion that is configured to engage around a lateral wall of the rack system. The first extending portion 204 includes the slot 112 through which a fastener can extend. The fastener helps to secure the exit trough 100 to the rack system. The second extending portion 206 includes the receiving slot 113.

A ledge 208 extends from the support member 102 in a direction opposite the base exit surface 108. The ledge 208 extends perpendicular from support member 102 and between the first bracket mechanism 104 and the second bracket mechanism 104. The ledge 208 is configured to rest upon the top edge of the lateral wall and provide additional support for the exit trough 100.

Figure 3:
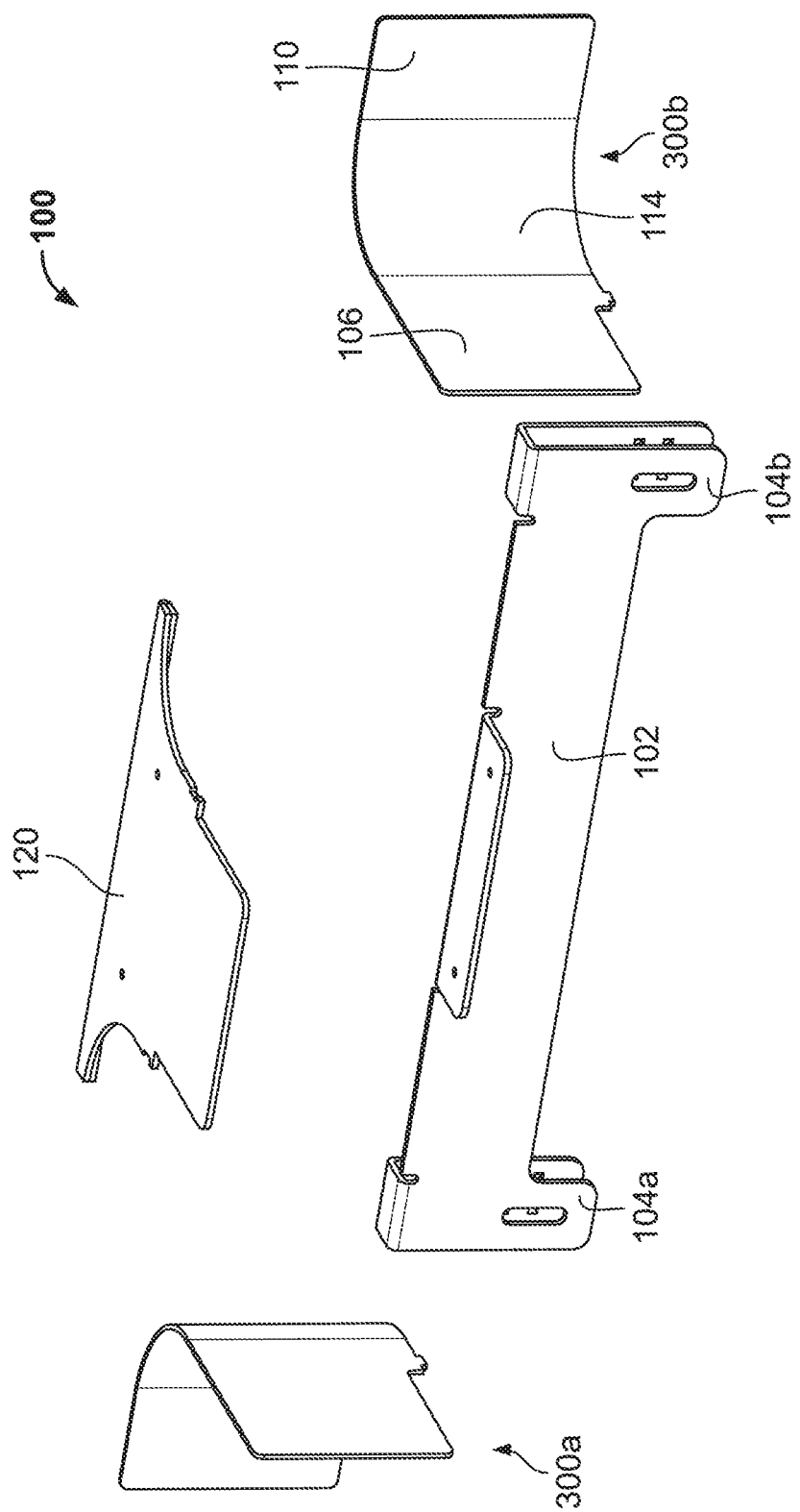
FIG. 3 illustrates an exploded view of the exit trough of FIG. 1.

FIG. 3 illustrates an exploded view of the exit trough 100. Each of the support member 102, the exit trough portion 120, the first sidewall member 300a, and the second sidewall member 300b may be individual elements that are fastened together before connecting to the rack system. In an embodiment, the sidewall members 300a, 300b are fillet welded to the support member 102. Alternatively, the exit trough 100 is a single element comprising support member 102, the exit trough portion 120, the first sidewall member 300a, and the second sidewall member 300b.

The support member 102 includes the first bracket mechanism 104 at a first end and the second bracket mechanism 104b at a second end. In the example shown, the support member 102 has a planar surface.

The exit trough 100 also includes a first sidewall member 300a and second sidewall member 300b, each of which include the sidewall 106 and the lateral sidewall 110 connected by the angled side wall portion 114. The first sidewall number 300a extends on a first side of the exit trough portion 120 and the second sidewall number 300b extends on a second side of the exit trough portion 120.

Figure 4:
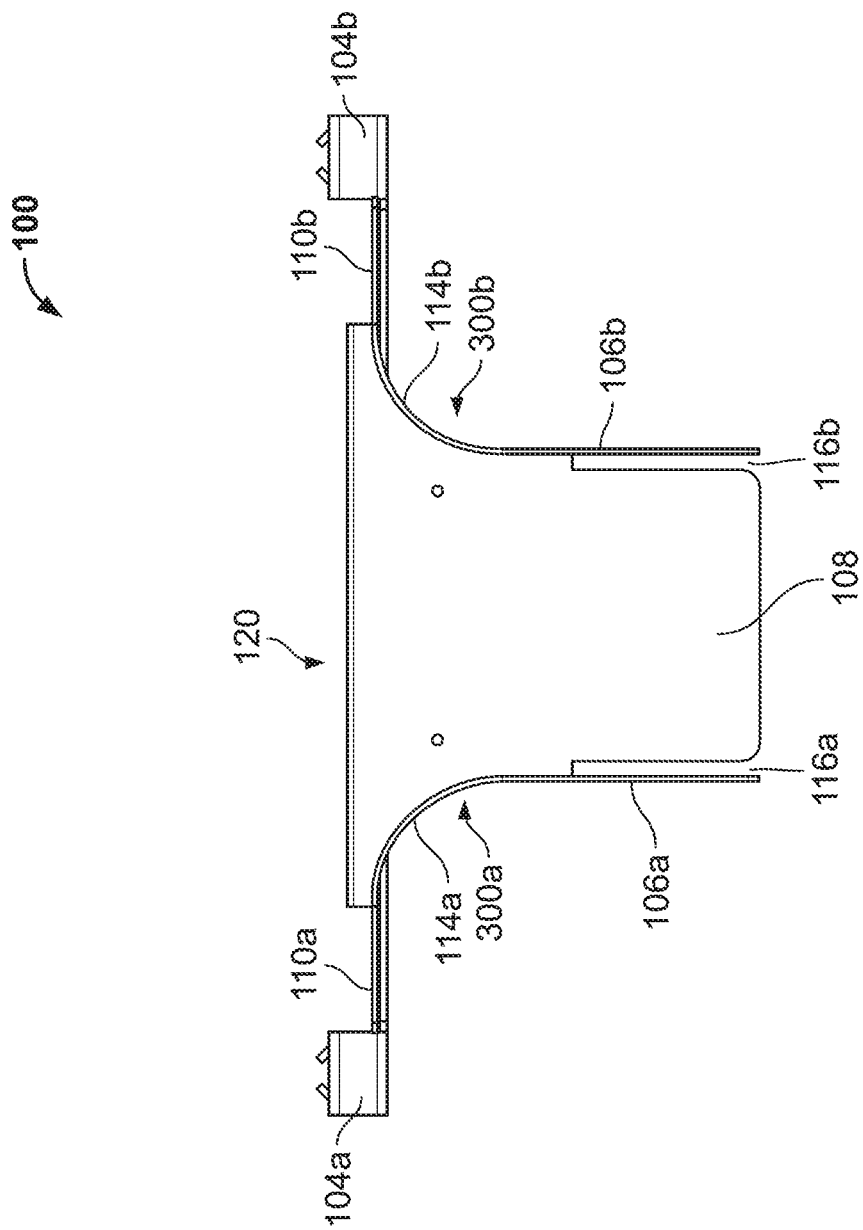
FIG. 4 is a top view of the exit trough of FIG. 1.

FIG. 4 is a top view of the exit trough 100 of FIG. 1. As shown, the exit trough portion 120 extends between the first sidewall member 300a and second sidewall member 300b. First sidewall 106a extends parallel to second sidewall 106b, and upright from the base exit surface 108. The first and second lateral sidewalls 110a, 110b extends in a parallel direction to the support member 102 and upright from the exit trough portion 120. The first and second bracket mechanisms 104a, 104b extends from support member 102 in the opposite direction from the first and second side walls 106a, 106b.

Figure 5:
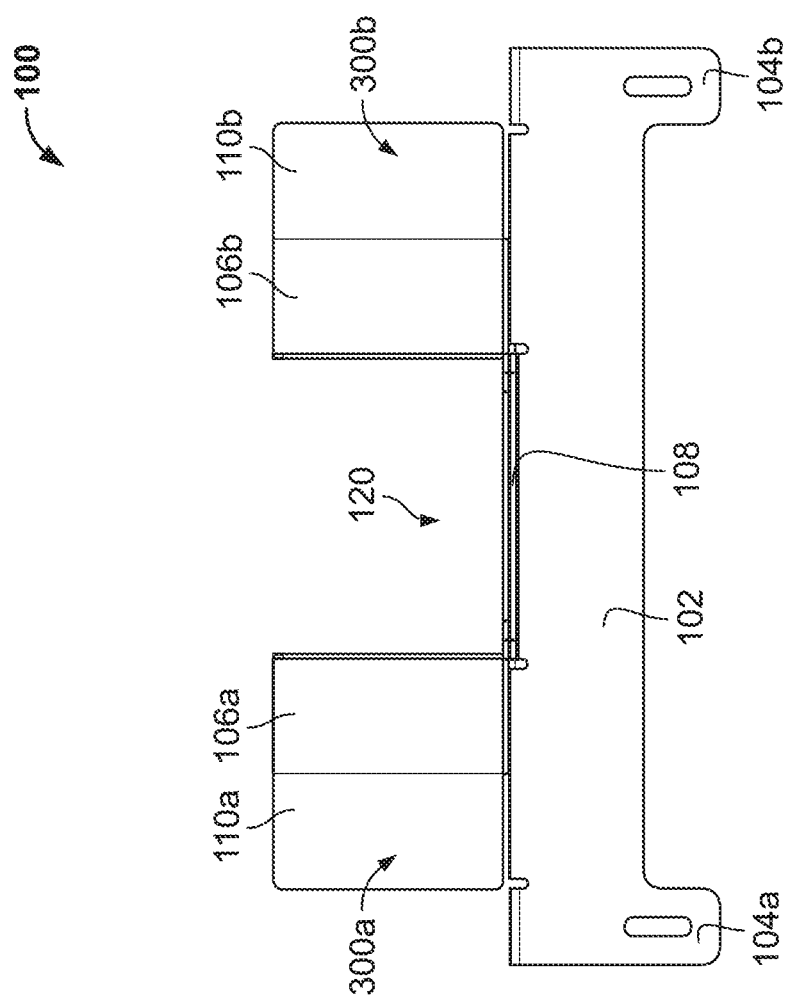
FIG. 5 is a front side view of the exit trough of FIG. 1.

FIG. 5 shows a front view of the exit trough 100. The base exit surface 108 extends perpendicular from the support member 102. The base exit surface 108 is planar. The first lateral sidewall 110a the second lateral sidewall 110b extend upright from support member 102 and generally the same direction. As shown, the first sidewall 106a and the second sidewall 106b extend perpendicular and upright from base exit surface 108 and parallel to each other. The first sidewall 106a, the base exit surface 108, and the second sidewall 106b define a U-shape to hold a plurality of fiber optic cables. The first and second sidewalls 106a, 106b have a continuous thickness.

Figure 6:
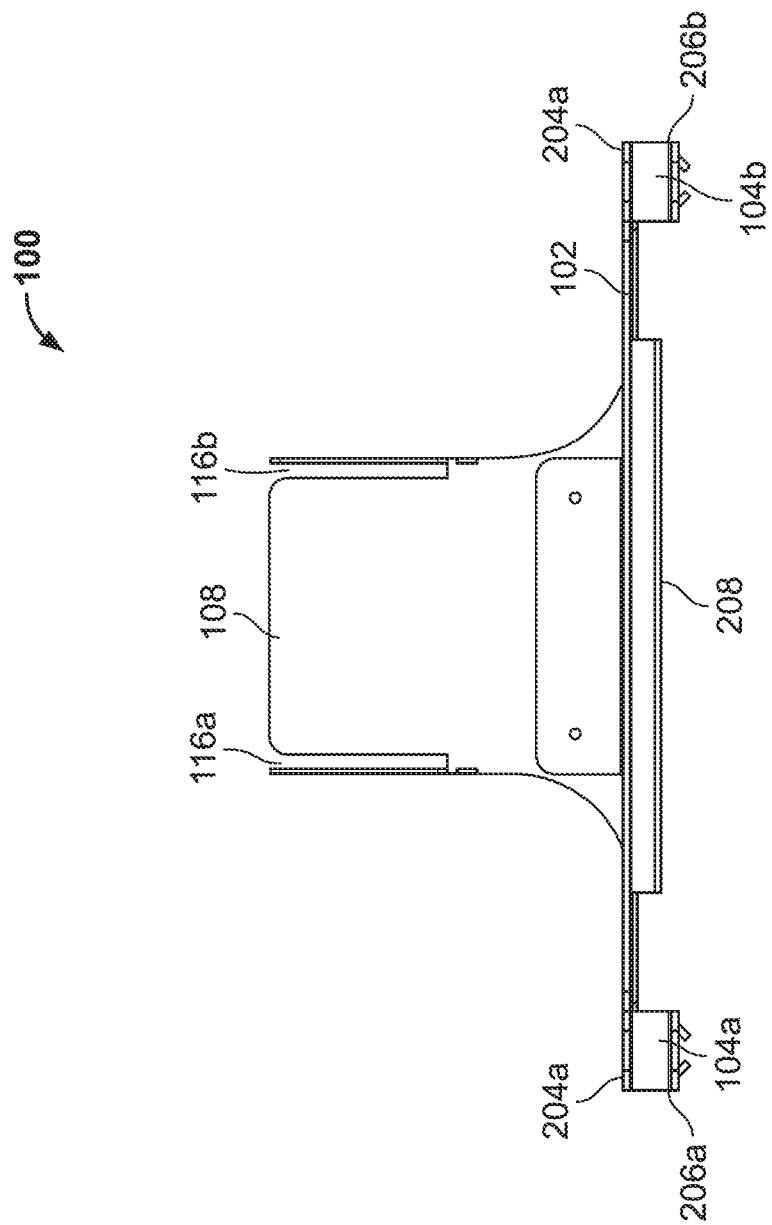
FIG. 6 is a bottom view of the exit trough of FIG. 1.

FIG. 6 is a bottom view of the exit trough 100. The ledge 208 extends from the support member 102 on the same side that the first and second bracket mechanisms 104 extend from, which is the side of the support member 102 that the rack system faces. The bracket mechanisms 104a, 104b each include the first extending portion 204a, 204b on an outside face, and the second extending portion 206a, 206b on the inside face. Also shown are the cutouts 116a, 116b that exist between the base exit surface 108 and first sidewall 106a, and the base exit surface 108 and the second sidewall 106b.

Figure 7:
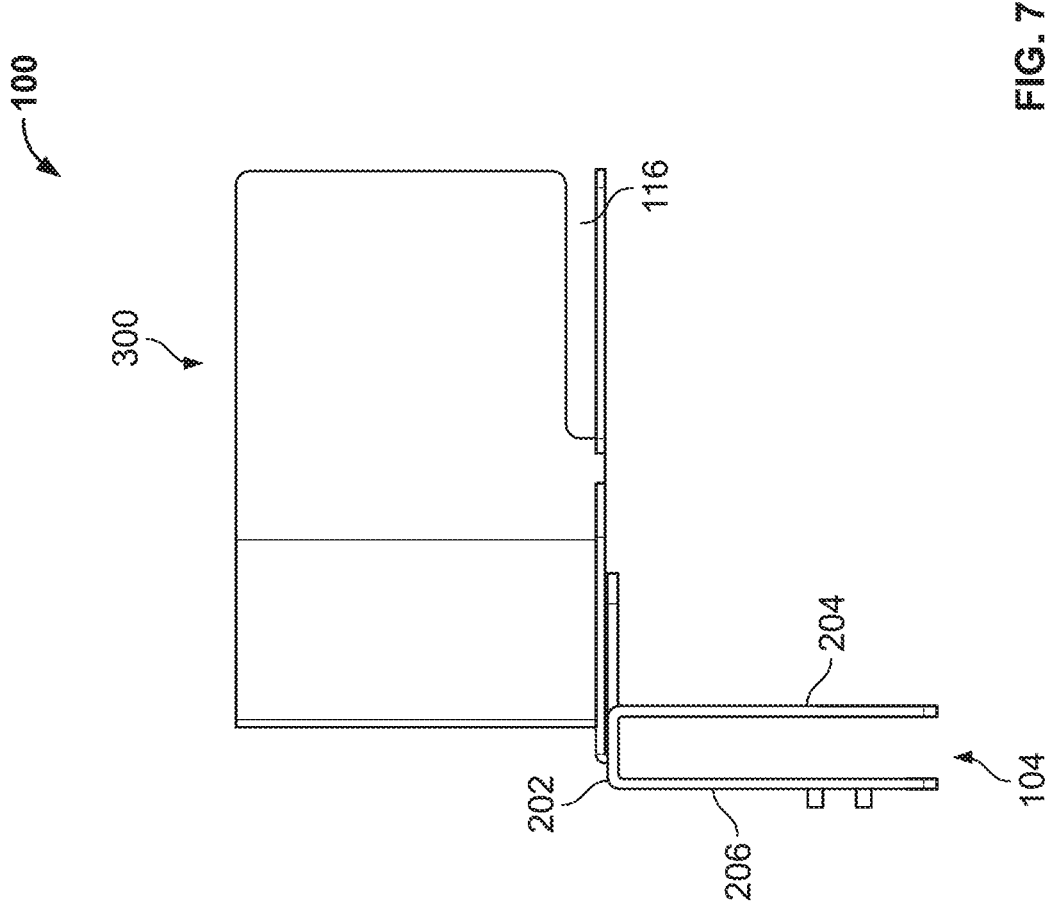
FIG. 7 is a cross-sectional view of the exit trough of FIG. 1.

FIG. 7 illustrates a cross-sectional view of the exit trough 100. The bracket mechanism 104 is U-shaped and includes the top surface portion 202, which has a horizontal orientation, a first extending portion 204 that extends perpendicular to the top surface portion 202, and a second extending portion 206 that extends parallel to the first extending portion 204. The cutout 116 extends partially into the sidewall member 300.

Figure 8:
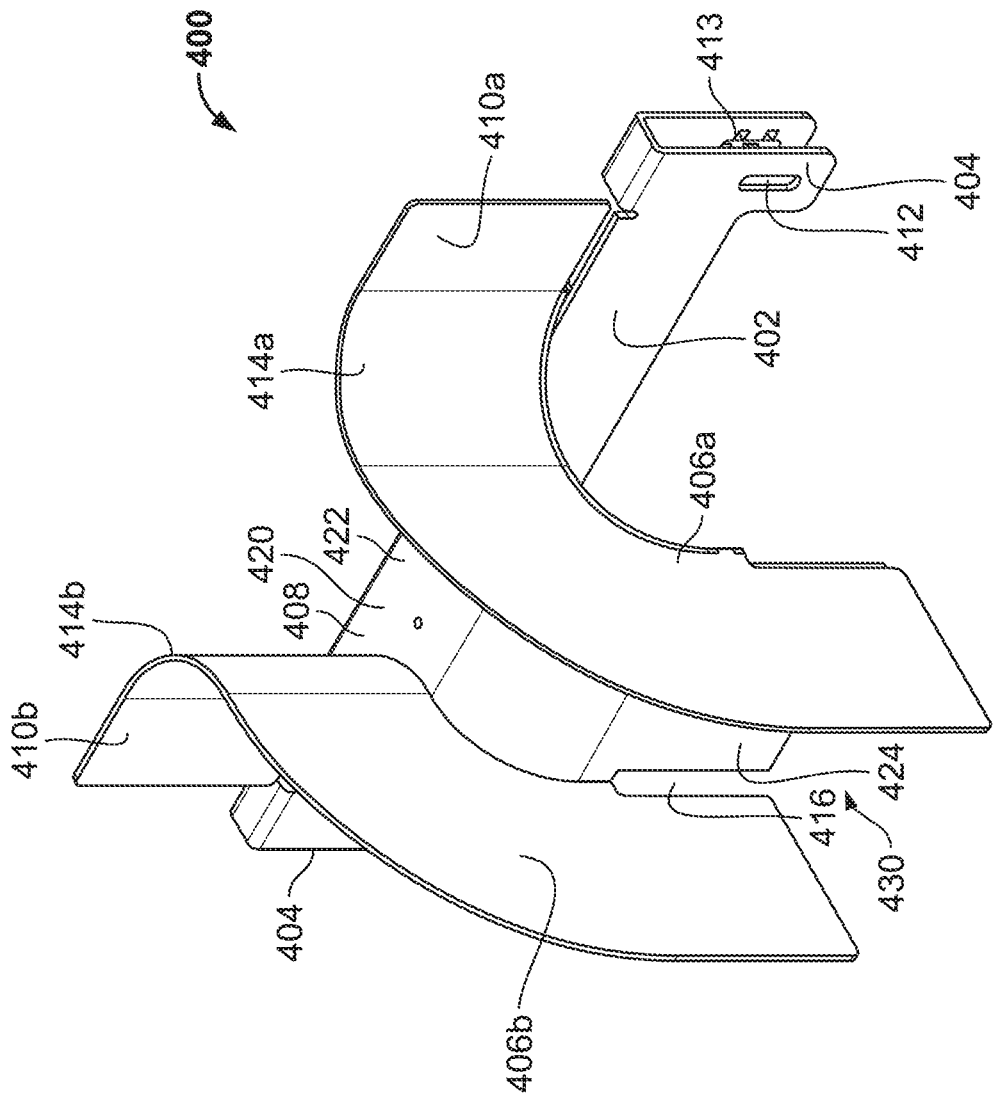
FIG. 8 illustrates an alternative embodiment of an exit trough.

FIG. 8 illustrates an alternative embodiment of an exit trough 400 having a downward spout 430. Exit trough 400 includes a support member 402 having a bracket mechanism 404 at a first end and a second bracket mechanism 404 at a second end. The support member 402 may have a planar shape and faces the lateral wall of the rack system.

Each bracket mechanism 404 includes a slot 412 on an outside face, which is configured to receive a fastener. The bracket mechanism 404 also includes a receiving slot 413 on an inside face that engages with the fastener. The fastener provides an additional friction fit of the exit trough 400 around the lateral wall of the rack, and is described in more detail at FIG. 16.

Exit trough 400 also includes an exit trough portion 420 extending generally in the middle portion of the support member 402. The exit trough portion 420 includes base exit surface 408, a first sidewall 406a, and a second sidewall 406b. The base exit surface 408 and the first and second side walls 406a, 406b define a generally U-shaped trough section through which optical cables extend. A first and second cutout 416a, 416b are provided at the open end of the exit trough portion 420 between the base exit surface 408 and each of the sidewalls 406a, 406b. The first and second cutouts 416a, 416b allow the exit trough 400 to be connected to other cable routing components, as well as provides more flexibility. The base exit surface 408 has a planar surface and extends generally downward from a first end 422 located at the rack system to a second end 424 that extends in a perpendicular direction relative to the first end 422 to define a downward spout 430. The second end 424 may be open or alternatively may be connected to another fiber optical cable management device.

The exit trough 400 also includes a first lateral sidewall 410a and second lateral sidewall 410b that extend generally parallel to the lateral walls of the rack system. First and second lateral sidewalls 410a, 410b connect to first and second side walls 406a, 406b at an angled side wall portion 414a, 414b.

Figure 9:
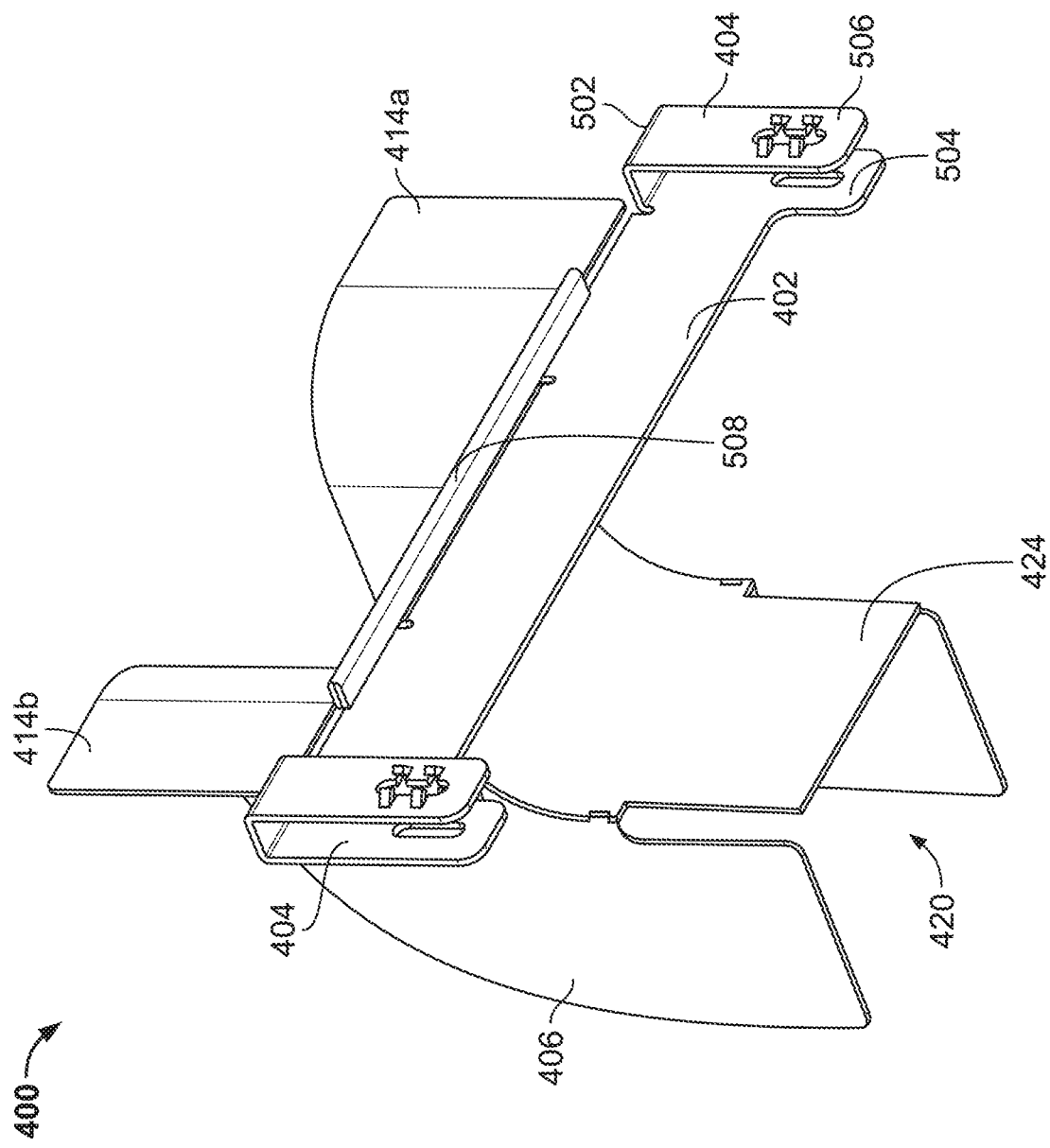
FIG. 9 illustrates a rear view of the exit trough of FIG. 8.

FIG. 9 illustrates a rear view of the exit trough 400. The exit trough 400 includes the support member 402 having a first bracket mechanism 404 at a first end, and a second bracket mechanism 404 at a second end. Each bracket mechanism 404 includes a top surface portion 502, a first extending portion 504, and a second extending portion 506. The top surface portion 502, the first extending portion 504, and the second extending portion 506 define a U-shaped portion that is configured to engage around a lateral wall of the rack system. The first extending portion 504 includes the slot 412 through which a fastener can extend. The fastener helps to secure the exit trough 400 to the rack system. The second extending portion 506 includes the receiving slot 413.

A ledge 508 extends from the support member 402 in a direction opposite the base exit surface 408. The ledge 508 extends perpendicular from support member 402 and between the first bracket mechanism 404 and the second bracket mechanism 404. The ledge 208 is configured to rest upon the top edge of the lateral wall and provide additional support for the exit trough 400.

Figure 10:
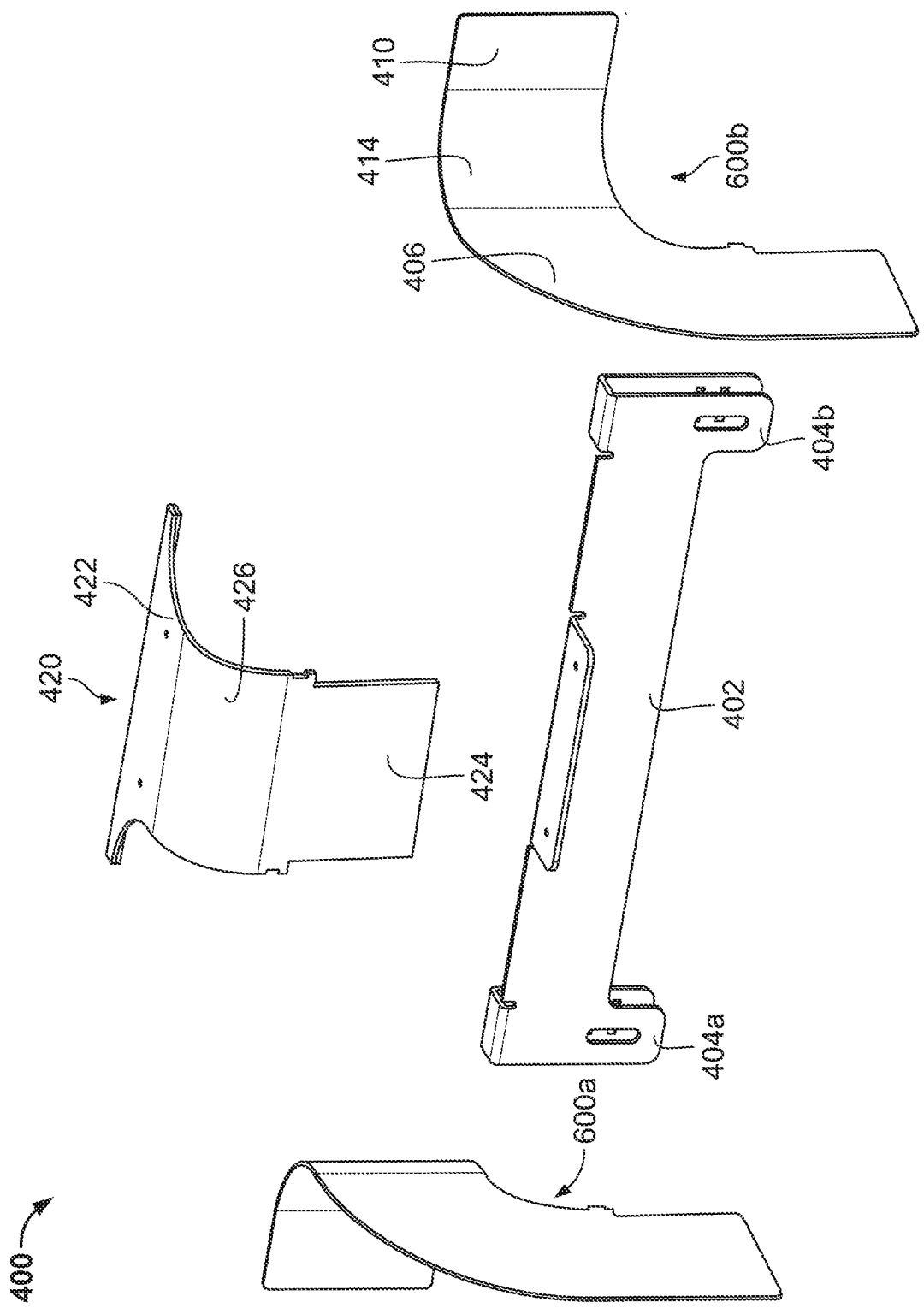
FIG. 10 illustrates an exploded view of the exit trough of FIG. 8.

FIG. 10 illustrates an exploded view of the exit trough 400. Each of the support member 402, the exit trough portion 420, the first sidewall member 600a, and the second sidewall member 600b may be individual elements that are fastened together before being connected to the rack system. In an embodiment, the sidewall members 600a, 600b are fillet welded to the support member 402. Alternatively, the exit trough 400 is a single element comprising support member 402, the exit trough portion 420, the first sidewall member 600a, and the second sidewall member 600b.

The support member 402 includes a first bracket mechanism 404a at a first end and a second bracket mechanism 404b at a second end. In the example shown, the support member 402 has a planar surface.

The exit trough 400 also includes a first sidewall member 600a and second sidewall member 600b, which each include the sidewall 406 and the lateral sidewall 410 connected by the angled sidewall portion 414. The first sidewall member 600a extends from a first side of the exit trough portion 420 and the second sidewall member 600b extends on a second side of the exit trough portion 420. As shown, the exit trough portion 420 extends generally planer from a first end 422 and then extends generally downward at the second end 424. A middle portion 426 of exit trough portion 420 includes a generally 90° downward turn to define a downward spout.

Figure 11:
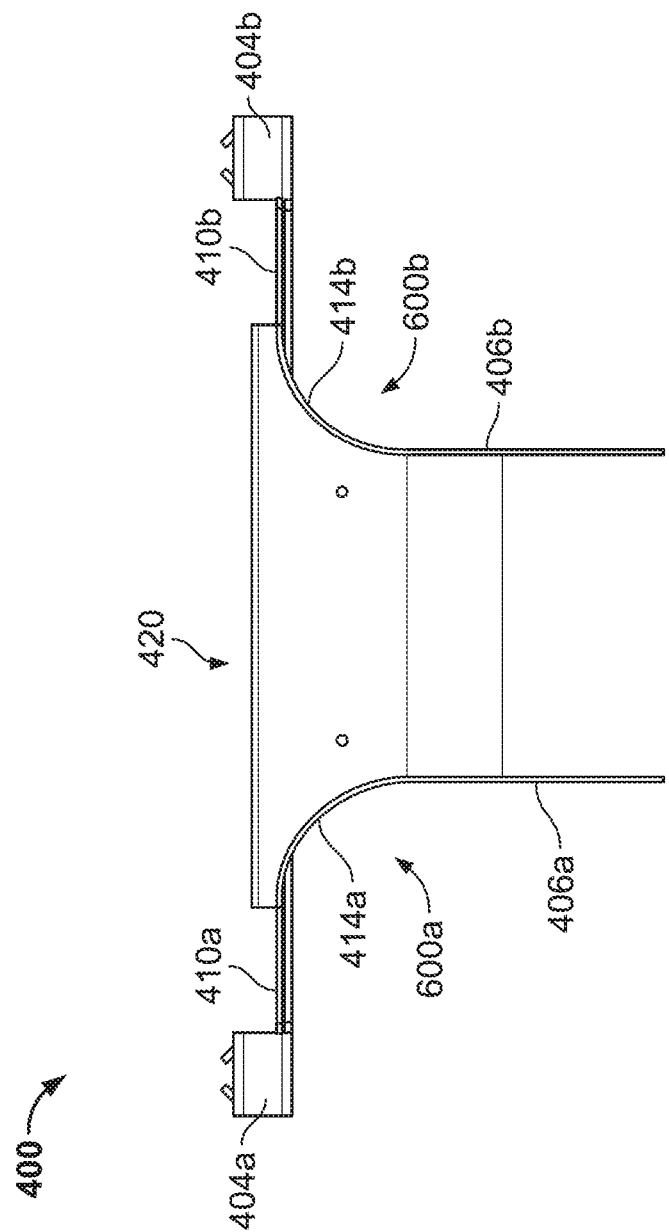
FIG. 11 is a top view of the exit trough of FIG. 8.

FIG. 11 is a top view of the exit trough 400 of FIG. 8. As shown, the exit trough portion 420 extends between the first sidewall 406a and second sidewall 406b. First sidewall 406a extends parallel to second sidewall 406b, and upright from the base exit surface 408. Also shown, the first and second bracket mechanisms 404a, 404b extend from support member 402. The first and second lateral sidewalls 410a, 410b extend in a parallel direction to the support member 402 and upright from the exit trough portion 420. The first and second bracket mechanisms 404a, 404b extend from support member 402 in the opposite direction from the first and second side walls 406a, 406b.

Figure 12:
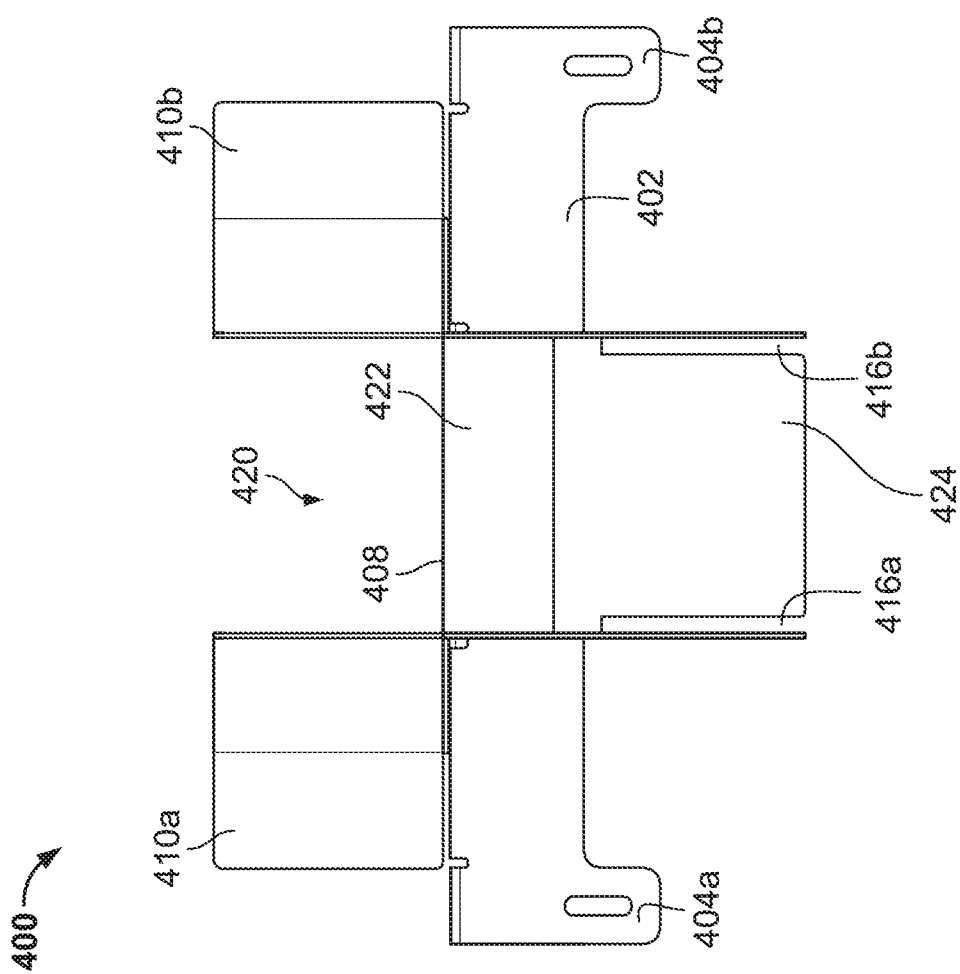
FIG. 12 is a front side view of the exit trough of FIG. 8.

FIG. 12 shows a front view of exit trough 400. The base exit surface 408 extends perpendicular from the support member 402. The base exit surface 408 is planar at a first end 422 and extends downward at the second end 424 to define a downward spout. The first lateral sidewall 410a the second lateral sidewall 410b extend upright from support member 402 and generally the same direction. As shown, the first sidewall 406a and the second sidewall 406b extend perpendicular and upright from base exit surface 408 and parallel to each other. The first sidewall 406a, the base exit surface 408, and the second sidewall 406b define a U-shape to hold a plurality of fiber optic cables. The first and second sidewalls 406a, 406b have a continuous thickness. A first and second cutout 416a, 416b exist between the first sidewall 406a, base exit surface 408, and second sidewall 406b at the second end 424.

Figure 13:
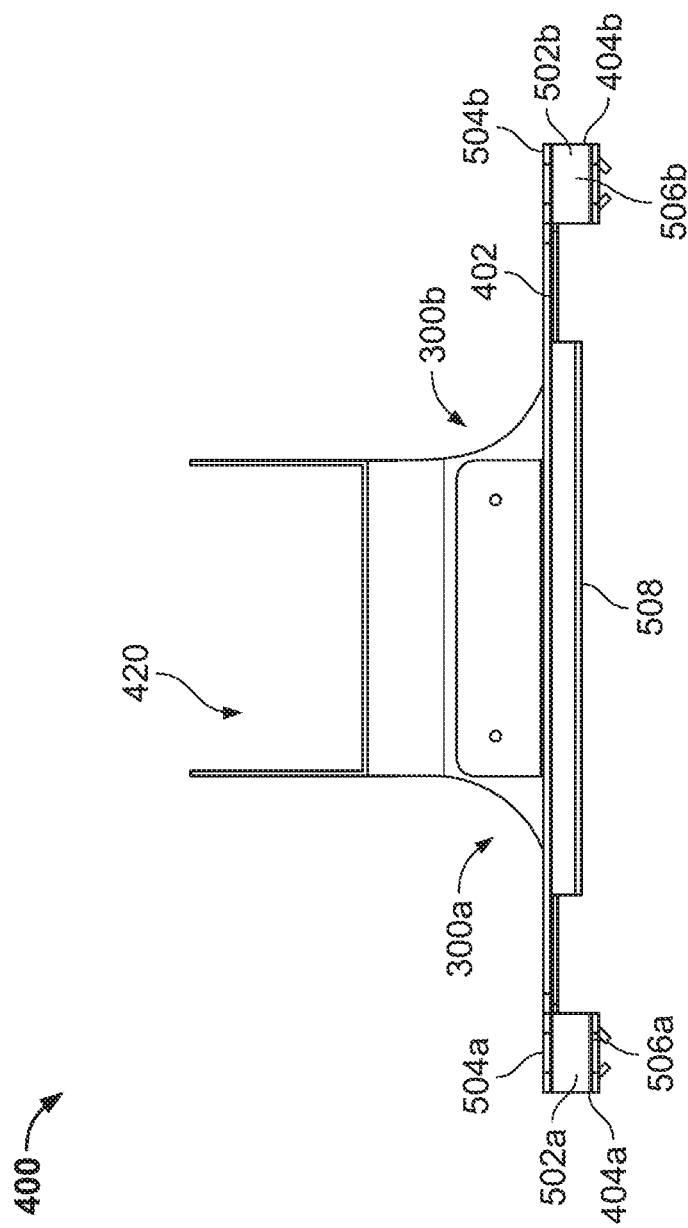
FIG. 13 is a bottom view of the exit trough of FIG. 8.

FIG. 13 is a bottom view of the exit trough 400. The ledge 508 extends from the support member 402 the same side that the first and second bracket mechanisms 404 extend from, which is the side of the support member 402 that the rack system faces. The bracket mechanisms 404a, 404b each include the first extending portion 504a, 504b on an outside face, and the second extending portion 506a, 506b on the inside face.

Figure 14:
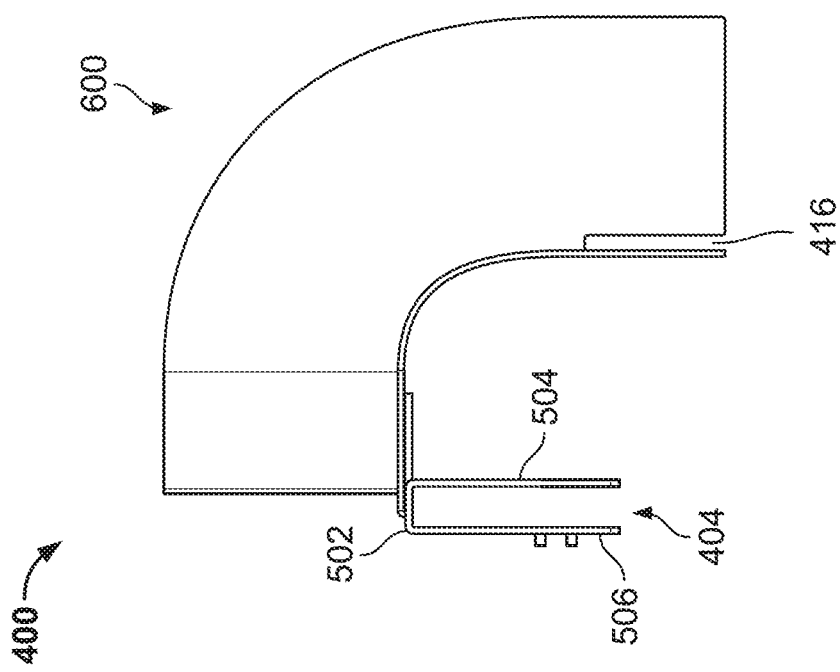
FIG. 14 is a cross-sectional view of the exit trough of FIG. 8.

FIG. 14 illustrates a cross-sectional view of the exit trough 400. The bracket mechanisms 404 is U-shaped and includes the top surface portion 502, which has a horizontal orientation, a first extending portion 504 that extends perpendicular to the top surface portion 502, and a second extending portion 506 that extends parallel to the first extending portion 504. The cutout 416 extends partially into the sidewall member 600.

Figure 15:
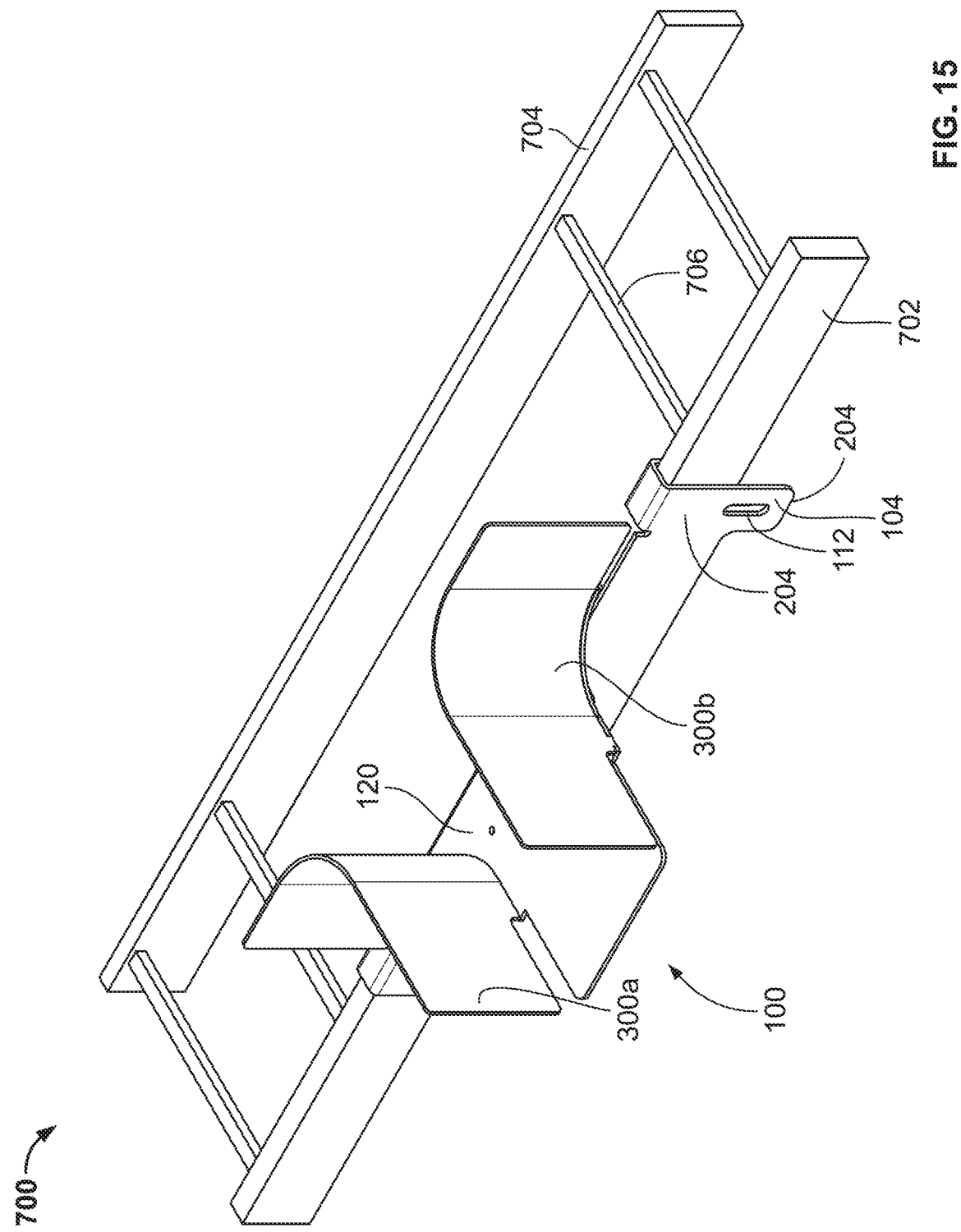
FIG. 15 illustrates an example embodiment of an exit trough connected to a ladder rack.

FIG. 15 illustrates an example embodiment of an exit trough 100 mounted to a rack system 700. The rack system 700 includes a first lateral wall 702 and a second lateral wall 704 connected by a plurality of rungs 706. The exit trough 100 is configured to be mounted around the first lateral wall 702.

As shown, the bracket mechanism 104 fits over the first lateral wall 702. A fastener (not shown) can extend through a first downward flange to the first lateral wall 702. As the fastener is tightened, a friction fit between the first extending portion 204 and the second extending portion (not shown). The fastener does not extend through the lateral wall 702, but extends along a bottom of the lateral wall 702.

Optical cables extend between the first lateral wall 702 and the second lateral wall 704 on top of the rungs 706. The optical cables can exit the rack system 700 through the exit trough 100 by extending between the first sidewall member 300a and the second sidewall member 300b.

Figure 16:
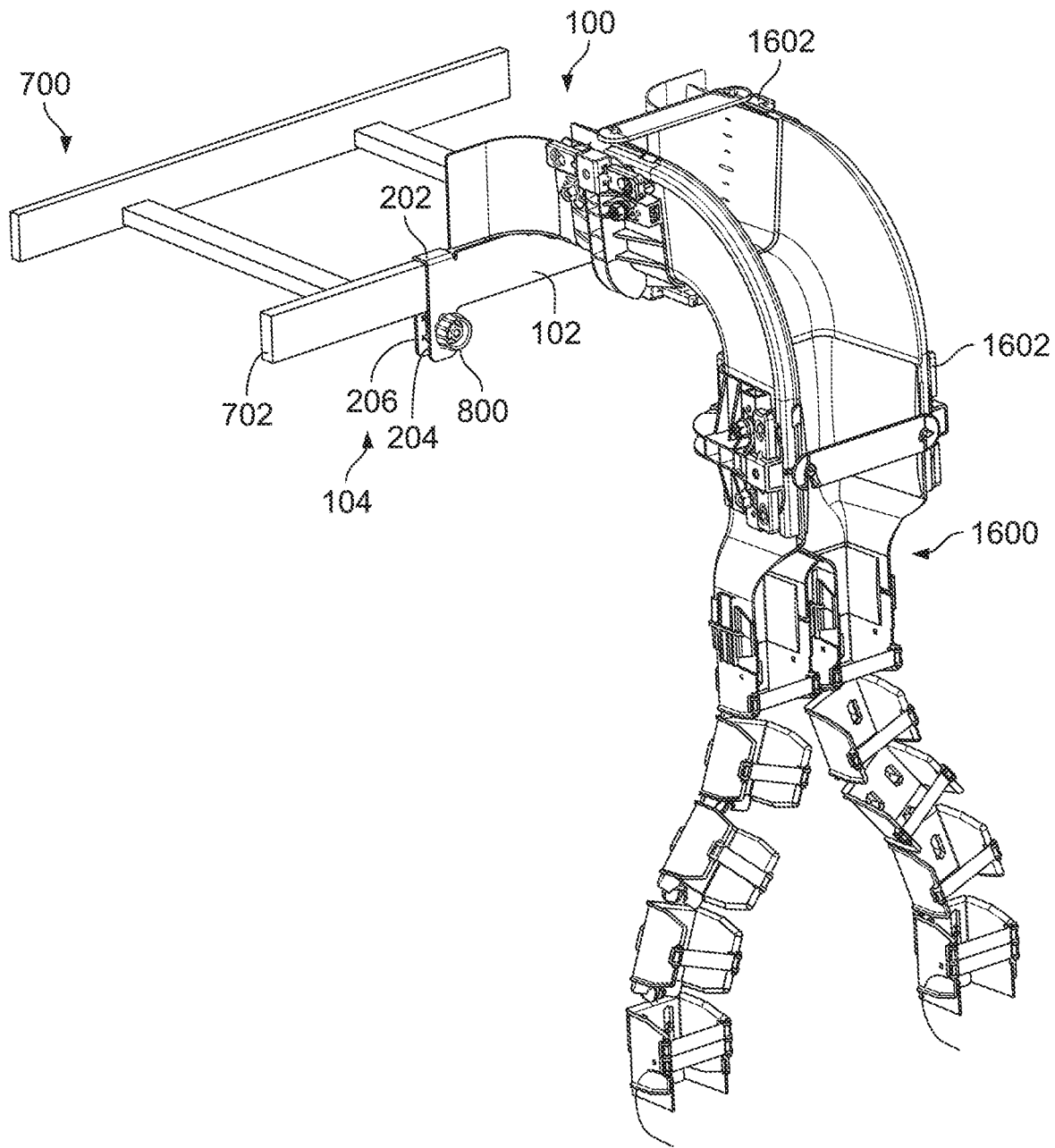
FIG. 16 illustrates another example embodiment of an exit trough of FIG. 1 connected to a ladder rack.

FIG. 16 illustrates an alternative embodiment of an exit trough 100 mounted to a rack system 700. The top surface portion 202 of the bracket mechanism 104 rests atop the lateral wall 702. The first extending portion 204 extends along a first side of the lateral wall 702, and the second extending portion 206 extends along a second side of the lateral wall 702. The slot, the receiving slot, and the fastener 800 extend below the lateral wall 702. A plurality of other cable-containing components 1600, including a connector extension 1602 are capable of connecting to the exit trough 100 on an end opposite the rack system 700.

Figure 17:
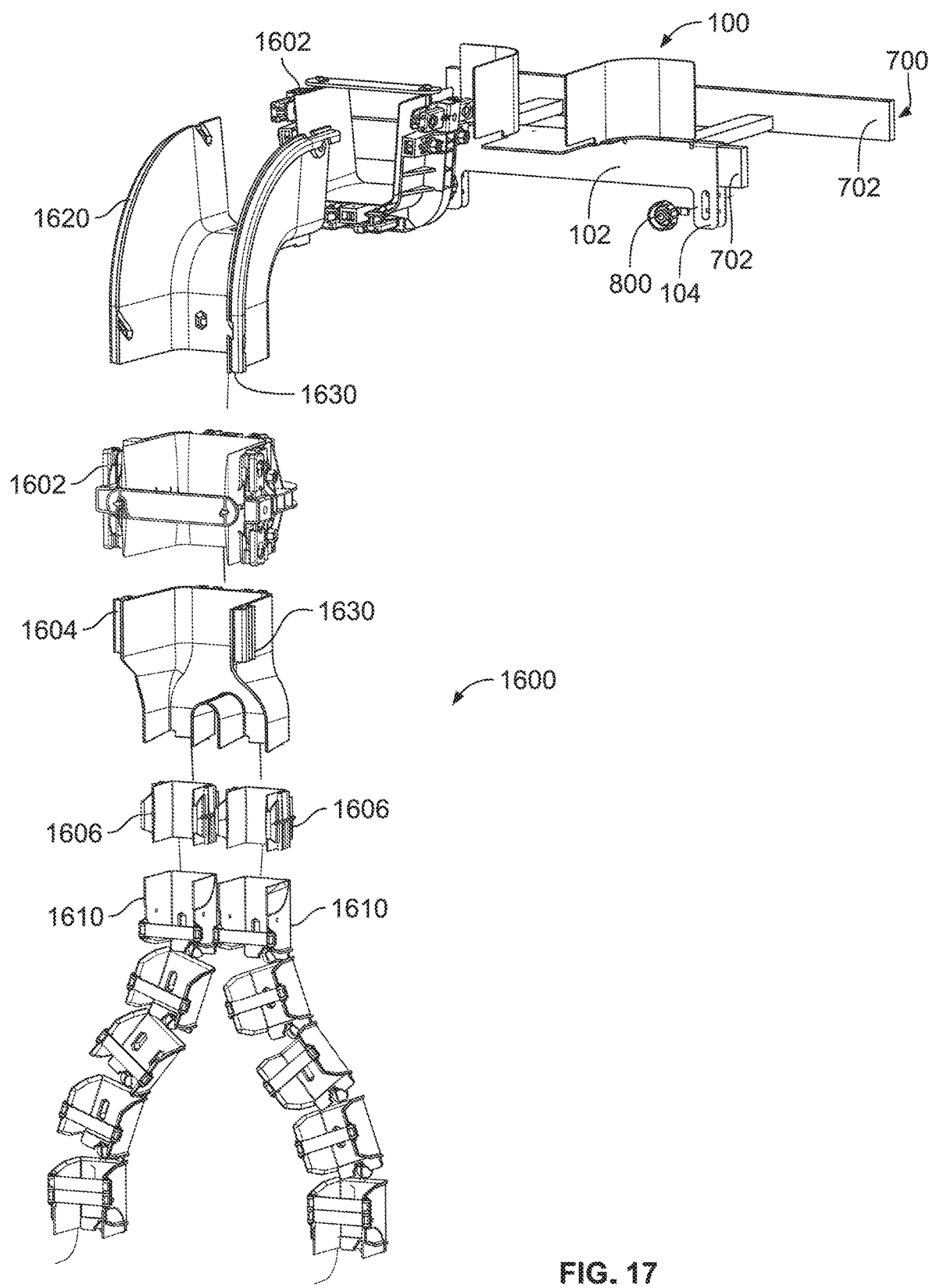
FIG. 17 illustrates another example embodiment of an exit trough of FIG. 1 connected to a ladder rack.

FIG. 17 illustrates an exploded view of an exit trough 100 mounted to a rack system 700. The exit trough 100 is capable of being mounted to a rack system 700 with a fastener 800. The exit trough 100 may be removeable mounted to the rack system 700, so the exit trough 100 may be moved as needed. As shown, additional cable-containing components 1600 are also capable of being connected to the exit trough 100. The cable-containing components 1600 may also be removeable mounted to the exit trough 100, so different components may be connected at different times. After the exit trough 100 is mounted to the rack system 700, where the slot of the first extending portion 204 and the receiving slot of the second extending portion 206 extend below the lateral wall 702, a fastener 800 secures the exit trough 100 to the rack system 700.

The cable-containing components 1600 includes a plurality of components. An exit connector extension 1602 may connect the exit trough 100 to a downspout 1620. The downspout 1620 includes a connection mechanism 1630 to connect to a connector extension 1602. The second connector extension 1602 can connect to a splitter 1604 at a connection mechanism 1630. The splitter 1604 can connect to two separate smaller cable troughs 1606, which each connect to adjustable cable troughs 1610.

Figure 18:
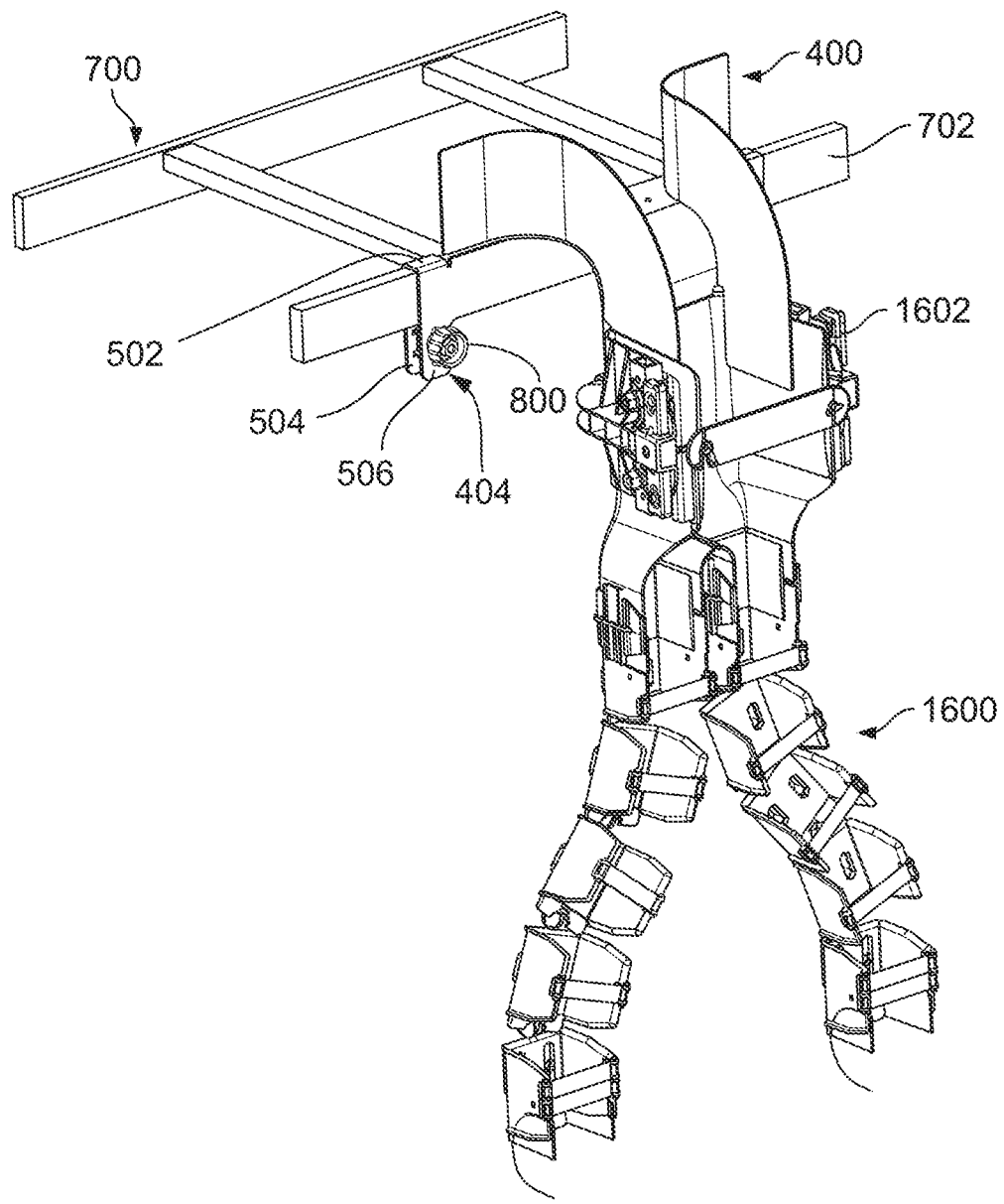
FIG. 18 illustrates another example embodiment of an exit trough of FIG. 8 connected to a ladder rack.

FIG. 18 illustrates an alternative embodiment of an exit trough 400 mounted to a rack system 700. The top surface portion 502 of the bracket mechanism 404 rests atop the lateral wall 702. The first extending portion 504 extends along a first side of the lateral wall 702, and the second extending portion 506 extends along a second side of the lateral wall 702. The slot, the receiving slot, and the fastener 800 extend below the lateral wall 702. A plurality of other cable-containing components 1600 are capable of connecting to the exit trough 400 on an end opposite the rack system 700 via a connector extension 1602.

Figure 19:
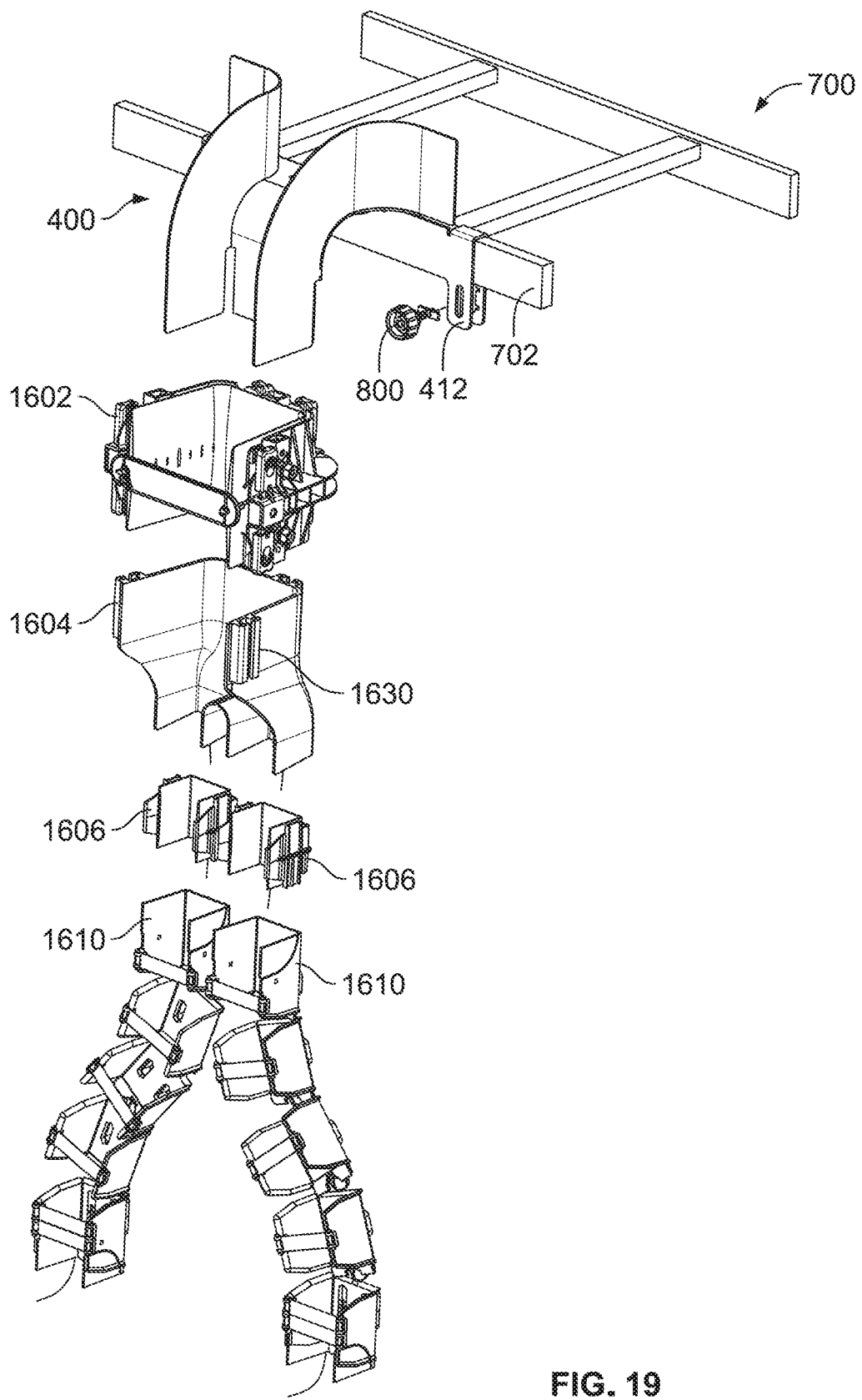
FIG. 19 illustrates another example embodiment of an exit trough of FIG. 8 connected to a ladder rack.

FIG. 19 illustrates an exploded view of an exit trough 400 mounted to a rack system 700. The exit trough 400 is capable of being mounted to a rack system 700 with a fastener 800. The exit trough 400 may be removable mounted to the rack system 700, so the exit trough 400 may be moved as needed. As shown, additional cable-containing components 1600 are also capable of being connected to the exit trough 400. The cable-containing components 1600 may also be removable mounted to the exit trough 400, so different components may be connected at different times. After the exit trough 400 is mounted to the rack system 700, where the slot of the first extending portion 504 and the receiving slot of the second extending portion 506 extend below the lateral wall 702, a fastener 800 secures the exit trough 400 to the rack system 700.

The cable-containing components 1600 includes a plurality of components. An exit connector extension 1602 may connect the exit trough 400 to a connection mechanism 1630 comprising a splitter 1604. The splitter 1604 can connect to two separate smaller cable troughs 1606, which each connect to adjustable cable troughs 1610.

FIGS. 16-19 show the example exit troughs 100, 400 mounted to a ladder rack system 700. Exit troughs 100, 400 form an adapter for allowing connection of cable containing components 1600 that may not otherwise be connectable to the ladder rack system 700. In particular, exit troughs 100, 400 allow for FIBERGUIDE™ trough components by CommScope Inc. to conveniently connect to a ladder rack system 700 where the fibers/cables are protected as they exit the ladder rack and extend downward to telecommunications racks or equipment below the ladder rack.

One example element that can connect to exit troughs 100, 400 is a snap fit junction or connector extension 1602 by CommScope Inc. An example snap fit connector extension 1602 is shown in U.S. Pat. No. 6,715,719, the disclosure of which is incorporated herein by reference. The sidewalls 106, 406 fit into the pocket defined by connector extension 1602 at one end. Fasteners can be driven from an exterior of connector extension 1602 through the outer wall portion to press inwardly against the sidewalls 106, 406 of the exit troughs 100, 400 inserted therein. In particular, the fasteners press the sidewalls 106, 406 against the inner wall of the connector extension 1602 to secure the parts together, in one example. The opposite end of connector extension 1602 connects to other system components, such as 1620, 1604 via the quick connect V-springs and T-slots interface as defined and shown in U.S. Pat. No. 6,715,719. Other connection methods can be used. The example T-slots are shown in the figures as connection mechanism 1630, further defined and shown in U.S. Pat. No. 6,715,719. FIGS. 16 and 17 show an additional connector extension 1602. Other trough components are also shown including downspout 1620, divider trough 1640, smaller cable trough 1606, and adjustable cable troughs 1610.

In this manner, the FIBERGUIDE™ trough components are linked to the ladder rack with the adapter-like functioning of the exit troughs 100, 400 for protection of the fibers entering and exiting the ladder rack.

Figure 20:
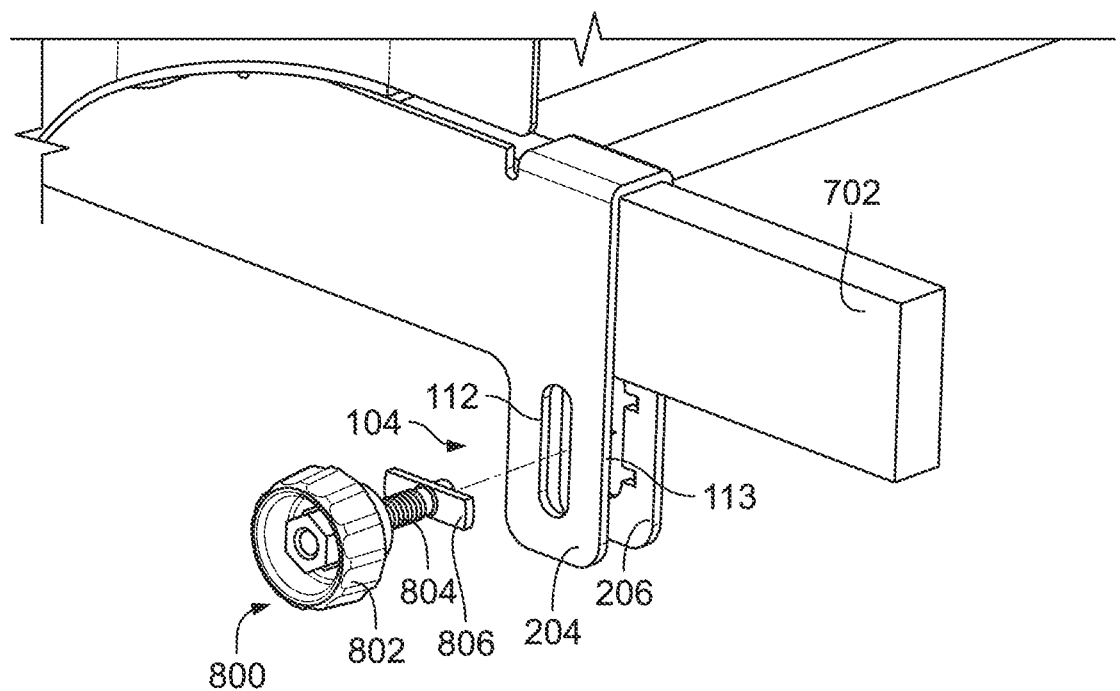
FIG. 20 illustrates an example embodiment of a bracket mechanism and fastener.

FIG. 20 illustrates an example of a bracket mechanism 104 and the fastener 800. The bracket mechanism 104 includes the first extending portion 204 and second extending portion 206 with a space there between, where the lateral wall 702 extends. The first extending portion 204 includes the slot 112, and the second extending portion 206 includes the receiving slot 113. Both the slot 112 and the receiving slot 113 extend below the bottom of the lateral wall 702.

The fastener 800 includes a turn piece 802 connected to a threaded cylinder 804 on first end. At an opposing end of the threaded cylinder 804 is a bar 806. The bar 806 is sized to fit easily through the slot 112 and to fit through the receiving slot 113 when angled. In use, the bar 806 is inserted through the slot 112 and the receiving slot 113. Then, the bar 806 is angled relative to the receiving slot 113, so the bar 806 cannot be forcefully pulled through the receiving slot 113. The turn piece 802 is threaded along the threaded cylinder 804, to effectively reduce the length of the threaded cylinder 804, and compress the first extending portion 204 and the second extending portion 206. The compression provided a friction fit of the bracket mechanism 104 around the lateral wall 702.

In use, a plurality of exit troughs may be mounted to a rack system to provide an exit for fiber optic cables from the rack system. The exit trough may be removeably connected to the rack system, so the exit toughs can be moved as needed. The fasteners may be provided on the bracket mechanism, so during installation, a user does not need to handle multiple components. Additional components may be added to the end of the exit trough portion as needed.

Embodiments of the present invention, for example, are described above with reference to block diagrams and/or operational illustrations of methods and systems according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A cable routing system comprising:
    a cable exit trough comprising:
        a base portion, and a first sidewall and a second sidewall extending from the base portion to define a cable exit pathway, a first cutout located between the base portion and the first sidewall, and a second cutout located between the base portion and the second sidewall, the first cutout and the second cutouts extending partially into the cable exit pathway;
        a support member having a top edge and a bottom edge, the support member extending on the top edge from a bottom surface of the base portion;
        a ledge extending perpendicular from the top edge of the support member in an opposing direction from the cable exit pathway;
        a first bracket on a first end of the support member and a second bracket on a second end of the support member, each bracket comprising a first extending portion having a slot and a second extending portion having a receiving slot; and
    a fastener comprising a turn piece, a threaded cylinder, and a bar, the bar and the threaded cylinder capable of extending through the slot and the receiving slot, wherein tightening the fastener causes the first extending portion and the second extending portion to compress.

2. The cable routing system of claim 1, wherein the base portion comprises a planar surface.

3. The cable routing system of claim 1, wherein the base portion comprises a downwardly curved surface.

4. The cable routing system of claim 1, wherein the cable exit pathway defines a U-shape.

5. The cable routing system of claim 1, wherein the bracket defines a U-shape for extending around a lateral wall of a rack system.

6. The cable routing system of claim 1, wherein the cable exit trough is configured to be mounted to a first lateral wall of a rack system with the cable exit pathway extending over a top edge of the first lateral wall of the rack system so that a cable can be routed from the rack system and out through the cable exit trough.

7. The cable routing system of claim 6, wherein the cable exit trough is removeably connected to the rack system.

8. The cable routing system of claim 1, wherein the first sidewall and the second sidewall comprise a continuous thickness.

9. The cable routing system of claim 1, wherein the first sidewall and the second sidewall extend parallel to each other along the base portion.

10. The cable routing system of claim 6, wherein the slot and the receiving slot extend below the bottom of the first lateral wall when the cable exit trough is mounted to the rack system.

11. The cable routing system of claim 6, wherein the ledge is adjacent to the top edge of the first lateral wall when the cable exit trough is mounted to the rack system.

12. A cable routing system comprising:
   a cable exit trough comprising:
      a base portion, and a first sidewall and a second sidewall extending from the base portion to define a cable exit pathway, a first cutout located between the base portion and the first sidewall, and a second cutout located between the base portion and the second sidewall, the first cutout and the second cutout extending partially into the cable exit pathway;
      a support member having a top edge and a bottom edge, the support member extending on the top edge from a bottom surface of the base portion;
      a ledge extending perpendicular from the top edge of the support member in an opposing direction from the cable exit pathway;
      a first bracket on a first end of the support member and a second bracket on a second end of the support member, each bracket comprising a first extending portion having a slot and a second extending portion having a receiving slot;
   a fastener comprising a turn piece, a threaded cylinder, and a bar, the bar and the threaded cylinder capable of extending through the slot and the receiving slot, wherein tightening the fastener causes the first extending portion and the second extending portion to compress; and
   wherein the cable exit trough is capable of being mounted to a first lateral wall of a rack system, the cable exit pathway extending over a top edge of the first lateral wall so that a cable can be routed from the rack system and out through the cable exit pathway.

13. The cable routing system of claim 12, wherein the base portion comprises a planar surface.

14. The cable routing system of claim 12, wherein the base portion comprises a downwardly curved surface.

15. The cable routing system of claim 12, wherein the slot and the receiving slot extend below the bottom of the first lateral wall when the cable exit trough is mounted to the rack system.

16. The cable routing system of claim 12, wherein the ledge is adjacent to the top edge of the first lateral wall when the cable exit trough is mounted to the rack system.

17. A method of assembling a cable routing management system comprising:
   providing a rack system comprising a first lateral wall and a second lateral wall connected by a plurality of rung members to define a trough surface;
   mounting a cable exit trough to the first lateral wall of the rack system;
   routing a plurality of cables from the rack system and transversely through the cable exit trough;
   wherein the cable exit trough includes a first bracket and a second bracket, each bracket comprising a first extending portion having a slot and a second extending portion having a receiving slot; and
   wherein the slot and the receiving slot extend below the bottom of the first lateral wall when the cable exit trough is mounted to the rack system.

18. The method of claim 17, wherein the cable exit trough is removeably connected to the rack system.

19. The method of claim 17, wherein the cable exit trough comprises a ledge configured to be placed upon a top edge of the first lateral wall.

* * * * *

UNITED STATES PATENT AND TRADEMARK OFFICE
CERTIFICATE OF CORRECTION

| | | |
|---|---|---|
| PATENT NO. | : 12,072,546 B2 | Page 1 of 1 |
| APPLICATION NO. | : 17/628433 | |
| DATED | : August 27, 2024 | |
| INVENTOR(S) | : Ruben Arvilla et al. | |

It is certified that error appears in the above-identified patent and that said Letters Patent is hereby corrected as shown below:

On the Title Page

Below "Aug. 25, 2022" insert:
--Related U.S. Application Data
(60) Provisional application No. 62/876,544, filed on Jul. 19, 2019.--

In the Specification

Column 1, Line 6: "is and a National Stage" should read --is a National Stage--

Signed and Sealed this
Twenty-second Day of April, 2025

Coke Morgan Stewart
*Acting Director of the United States Patent and Trademark Office*